Aug. 19, 1924.
C. A. HANSON
1,505,260
SAW SET
Filed May 31, 1922  3 Sheets-Sheet 1
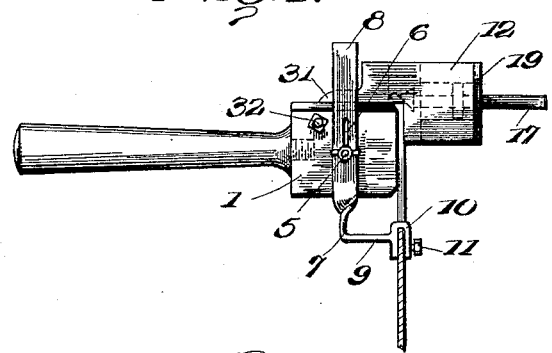
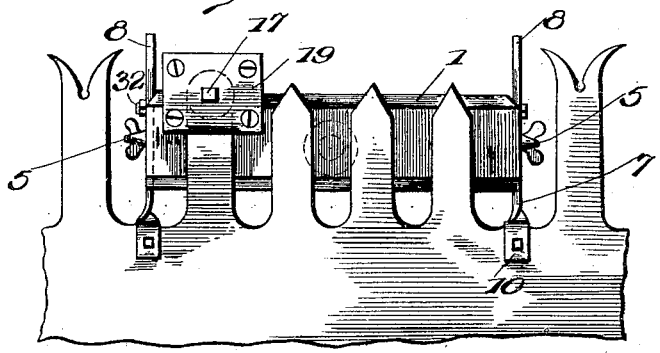
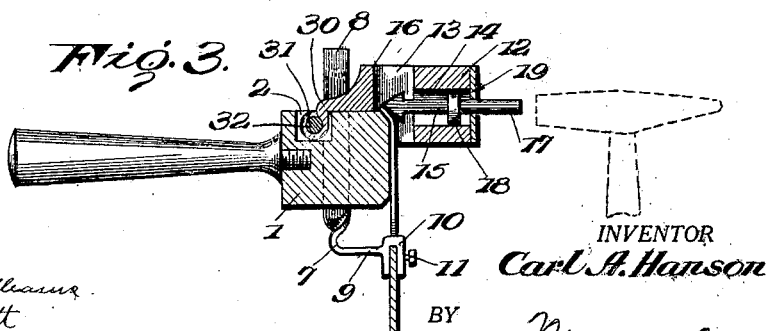
WITNESSES
INVENTOR
Carl A. Hanson
BY
ATTORNEYS Aug. 19, 1924.
C. A. HANSON
SAW SET
Filed May 31, 1922
1,505,260
3 Sheets-Sheet 2
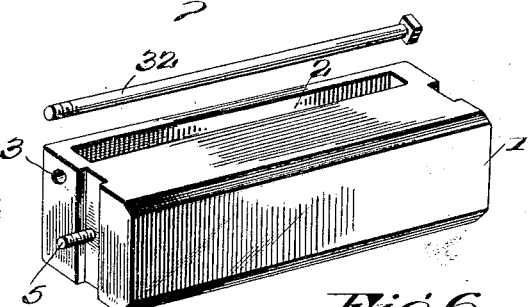
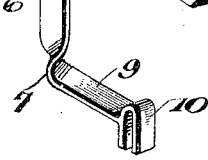
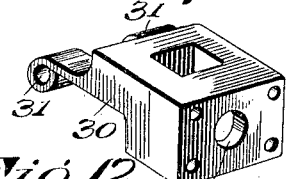
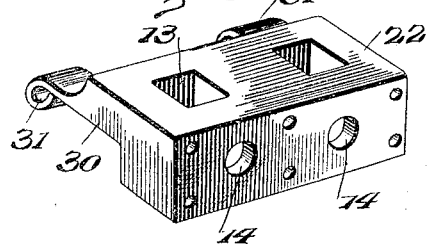
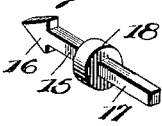
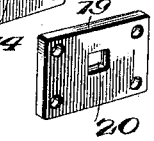
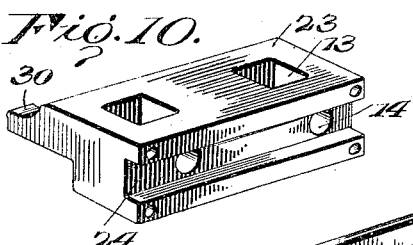
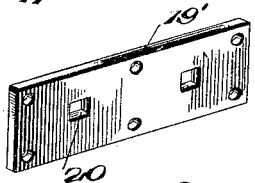
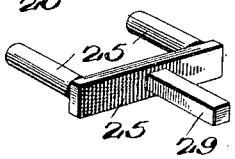
WITNESSES
INVENTOR
Carl A. Hanson
BY
ATTORNEYS Aug. 19, 1924.
C. A. HANSON
1,505,260
SAW SET
Filed May 31, 1922    3 Sheets-Sheet 3
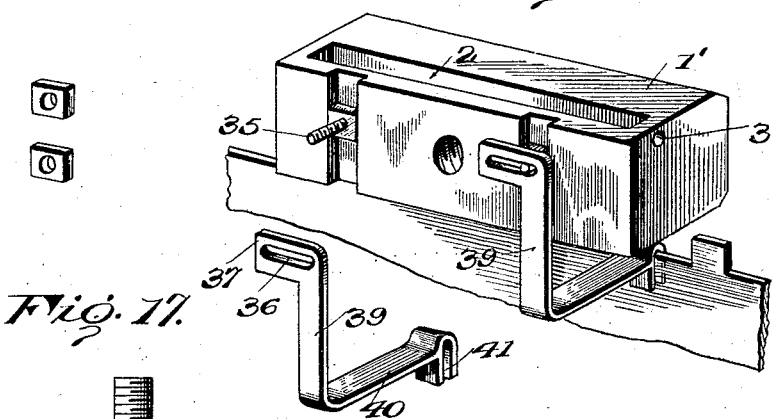
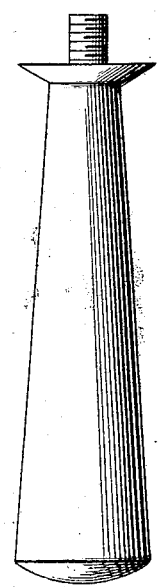
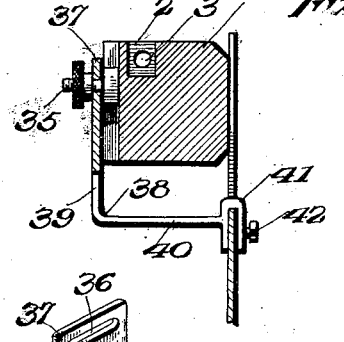
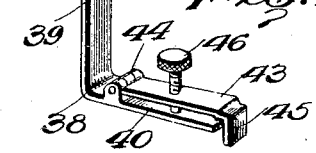
WITNESSES
INVENTOR
Carl A. Hanson.
BY
ATTORNEYS Patented Aug. 19, 1924.

1,505,260

UNITED STATES PATENT OFFICE.

CARL ALFRED HANSON, OF PORTLAND, OREGON.

SAW SET.

Application filed May 31, 1922. Serial No. 564,928.

*To all whom it may concern:*

Be it known that I, CARL A. HANSON, a citizen of the United States, residing at Portland, in the county of Multnomah and State of Oregon, have invented certain new and useful Improvements in Saw Sets, of which the following is a specification.

The present invention relates to an improved saw set and has for its object to provide a very simple device of this character by means of which the teeth of a crosscut saw can be very quickly and easily set.

A further object resides in the provision of a saw setting device which may be arranged upon saw blades of conventional construction and is of such construction that the device may be readily moved upon the blades for the engagement of the setting members with the successive teeth of the saw.

A still further object of the invention is to generally improve upon a saw set of this character by providing a device which will be extremely simple and efficient in construction, reliable in operation, comparatively inexpensive to manufacture, and well adapted to the purpose for which it is designed.

With these and other objects in view, the invention consists of the novel features of construction, combination and arrangement of parts hereinafter fully described and claimed, and illustrated in the accompanying drawings, in which—

Figure 1 is a side elevation of a saw set constructed in accordance with the present invention showing the same arranged upon a saw blade, Figure 2 is an end elevation thereof, Figure 3 is a section therethrough, Figure 4 is a detailed perspective of the main block, Figure 5 is a detailed perspective of a supporting bracket, Figure 6 is a perspective of a hinged block, Figure 7 is a perspective of a plate therefor, Figure 8 is a perspective of another hinged block, Figure 9 is a perspective of a plate therefor, Figure 10 is a perspective of another hinged block, Figure 11 is a perspective of a plate therefor, Figure 12 is a perspective of a punch, Figure 13 is a perspective of another punch, Figure 14 is a perspective of a modified form of the block and brackets therefor, Figure 15 is a section taken therethrough, and Figure 16 is a perspective of a reversible bracket.

Figure 17 is the handle for said set block.

Referring to the drawings in detail it will be seen that the main block 1 is provided on its upper face adjacent one side with a longitudinally extending recess 2 having the openings 3 communicating therewith through the ends of the block. In the ends of the block there are provided suitable grooves 4 having the threaded studs 5 extending intermediately therefrom which are adapted to penetrate to the slots 6 in the brackets 7 which are of angular construction having the normally vertical arm 8 and horizontal arm 9 which terminates in a U-shaped clamp 10 adapted to straddle the saw as is shown to advantage in Figures 1 and 3 and held in place by a set screw 11. Thus it will be seen that the main block 1 may be adjusted vertically between the two brackets 7 supporting the same. The hinged block shown in Figures 6 and 7 and indicated generally at 12 is constructed with the saw tooth receiving recess 13 which communicates with a bore 14 adapted to receive the punch 15. This punch 15 is preferably constructed with an arrow head 16 mounted on the end of the shank 17. On this shank 17 between the ends thereof is a piston member 18 ridable in the bore 14. A plate 19 is adapted to be fixed on the end of the block 12 so that its rectangular shaped opening 20 registers with the bore 14 for receiving the end of the shank 17 so that the same may extend therethrough. The block 22 shown in Figure 8 is similarly constructed to the block 12 except that two recesses 13 are provided with corresponding bores 14 and the plate 19' is provided with a pair of rectangular openings 20 so that two punches 15 may be received. The hinged block 23 shown in Figure 10 is provided with the tooth receiving recess 13 and registering bores 14 and also with a longitudinally extending groove 24 upon its end for the purpose of receiving the cross piece 25 supporting the two punches 26 adapted to slide in the bores 14. A plate 27 is suitably mounted over the end of the block having the groove 24 therein so that its rectangular shaped opening 28 receives the shank 29 projecting from the cross piece 25 supporting the punches 26. Each of the blocks 12, 22 and 23 are provided with a pair of extensions 30 terminating in the rolled ears 31 adapted to be received in the recess 2 of the main block 1 so that the bolt 32 may pass therethrough and through the openings 2 thereby hinging these hinged blocks in relation to the main block 1 as will be readily understood from an inspection of Figure 3.

In Figures 14 and 15 I have illustrated a slightly modified form of the main block 1' which is provided with the usual recess 2 and openings 3. This block, however, is provided on its rear face with the projecting threaded studs 35 which are adapted to extend through the slots 36 in the offset lips 37 of the brackets 38 which are of angular construction including the normally vertical arm 39 and normally horizontal arm 40. This normally horizontal arm 40 terminates in a U-shaped clamp 41 for engaging the edge of the saw blade as is shown in Figures 14 and 13 and is held in place by a set screw 42. This allows the block to be shifted longitudinally in relation to the saw without the necessity of moving the brackets and also allows the brackets to be set in relation to the saw whereby a device may be used with saws wherein the teeth are not evenly spaced in relation to each other.

In Figure 16 I have shown a modified form of the bracket which includes the vertical arm 39 and horizontal arm 40 and also the offset lip 37 having a slot 36 therein. An auxiliary leaf 43 is pivoted on the horizontal arm 40 as at 44 and is provided at its terminal with a depending lip 45. A set screw 46 carried by the leaf 43, bears upon the arm 40, turning of the screw producing an adjustment of the leaf.

It is thought that the operation and construction of the invention will now be clearly understood without a more detailed description thereof. It is, however, desired to point out that numerous changes in construction and in the combination and arrangement of parts may be resorted to without departing from the scope of the invention as hereinafter claimed.

Having thus described my invention what I claim as new is:—

1. In combination, a pair of angularly constructed brackets having normally vertical slots therein, U-shaped clamping members on the terminals of the brackets for engagement with a saw blade, a main block adjustable vertically between the brackets by having threaded studs extending from its ends through the slots of the brackets, a hinged block mounted on the main block and provided with a tooth receiving recess, and a bore communicating with the recess, a punch including a shank having a piston element intermediate its ends slidably mounted in the bore, and means for limiting the movement of the punch.

2. A saw set comprising an anvil, means carried by the anvil to engage a saw blade in the spaces between teeth to support the anvil at one side of the saw, a setting block carried by the anvil, means upon which it is mounted to swing into an operative position at the other side of the saw, and a setting pin carried by the block and operable therein toward the anvil.

3. A saw set comprising an anvil, means carried by the anvil and extending forward to engage and rest upon a saw blade in spaces between teeth and thus support the anvil at one side of the saw, means which provide a hinge mounted on the anvil, a setting block carried by said means being swingable over the saw to a resting position at the side opposite to the anvil, and a setting pin carried by the block operable against the saw teeth toward the anvil.

4. A saw set comprising an anvil, means carried by the anvil and extending forward to engage and rest upon a saw blade in spaces between teeth and thus support the anvil at one side of the saw, means which provides a hinge mounted on the anvil, a setting block carried by said means being swingable over the saw to a resting position at the side opposite to the anvil, a setting pin carried by the block operable against the saw teeth toward the anvil, and means for limiting the movement of the setting pin in one direction.

5. A saw set comprising an anvil, brackets carried by the anvil engaging a saw blade in spaces between teeth to support the anvil at one side of the saw, means permitting adjustments of the brackets in respect to the anvil, means providing a hinge situated on top of the anvil, a setting block carried by the hinge swingable over the saw to a resting position at the opposite side of the anvil, a setting pin carried by the block and having a limiting collar, and a plate carried by the block through which an end of the pin projects but which holds the pin in position.

6. A saw set comprising an anvil, brackets extending from the anvil, means on the free extremities of the brackets fitting over a saw blade at places between the teeth, means to adjust the brackets to change the positions thereof in respect to the anvil, a hinge pin mounted on the anvil, a setting block carried by said pin swingable down into engagement with the top of the anvil to assume a position in front of the saw and opposite to the front of the anvil, and a setting pin carried by said block.

7. A saw set comprising an anvil having grooves, a bracket situated at each groove, clamping means for each bracket extending into the groove permitting adjustments of the brackets in respect to the anvil, means carried by each bracket fitting over a saw in spaces between teeth to gauge the position of the anvil in respect to the teeth, a hinge pin, means by which the hinge pin is mounted on the anvil, a setting block mounted on the hinge pin being swingable into position over the saw, including a portion resting on top of the anvil and a front portion assuming a position in front of the saw opposite to the anvil; and a setting pin carried by said front portion and operable toward the anvil.

8. A saw set comprising an anvil having a groove at each end, a bracket occupying each groove having an arm extending from the anvil, mounting means on each arm including an inverted U-housing to fit over the saw in a space between teeth, means to adjust each bracket in the respective groove independently, a setting block hinged on the anvil to swing in front of the saw, and a setting pin carried by the block.

9. A saw set comprising an anvil having a groove at each end, brackets extending from the anvil including angle portions fitting on a saw blade in spaces between teeth to mount the anvil and said beveled edge in a predetermined relationship, a setting block having a narrow portion with an opening to receive a saw tooth, and a heavier portion situated at the front of the saw when said block is in operative position, a hinge by which the setting block is mounted to swing on the anvil until said narrow portion rests on top of the anvil adjacent to said bevel, and a setting pin operable in said heavy portion provided with an end shaped corresponding to said bevel for swaging a saw tooth.

10. A saw set comprising an anvil, a setting block hinged upon the anvil including a portion resting on top of the anvil and a second portion situated in front and in opposition to the anvil to define a saw space when the setting block is in the operative position, a setting pin in said second portion operative toward the anvil, and means to limit the outward movement of the setting pin.

11. A saw set comprising an anvil, brackets carried by the anvil extending therefrom, an inverted U-housing at the extremity of each bracket to fit down over the saw blade in spaces between the teeth, adjusting screws and jam nuts carried by the housing to compensate for any looseness occasioned by different thickness of saw blades, a setting block hinged on the anvil to swing in a position in front of the saw and opposite to the anvil, and a setting pin carried by the block.

12. A saw set comprising an anvil, a setting block hinged on the anvil to swing down into position over a saw blade, said block having an opening to make room for an upright saw tooth in front of the anvil and a lateral communicating opening defining a chamber; a plate fitted outside of the block having a registering opening smaller than the chamber, and a setting pin situated in said opening in position to be driven against the saw tooth in the first opening, said means having an enlargement bearing in the chamber by which the movement of the pin is limited.

13. A saw set comprising an anvil having a groove on top and in the ends, a hinge pin mounted in the top groove, brackets mounted in the end grooves extending from the anvil and terminating in inverted U-housings to fit on a saw blade between the teeth, a setting block having a portion entering the top groove and receiving the hinge pin, said block resting on top of the anvil and extending down in front when in the operative position; and a setting pin carried by the front portion of the block to operate toward the anvil.

14. A saw set comprising an anvil, means by which it is mounted on a saw blade, a setting block hinged on the anvil having an opening and a top groove the former receiving a saw tooth, a cover plate on the front of the block to cover the groove, a setting pin operable in the block toward said opening, a plate carrying said pin operable in said groove, and an extension on the plate passing through the cover into a position to be struck.

15. A saw set comprising an anvil, a pair of angle brackets having portions formed at right angles at one extremity and provided with slots, means by which said brackets are attached to the anvil at said slots and inverted U-housings at the other extremity to fit upon the edge of a saw between teeth; a setting block hinged upon the anvil to swing down to one side of the saw, and a setting pin carried by said block.

16. A saw set comprising an anvil having grooves, a pair of brackets each including a slotted portion facing a groove, means at one extremity of each bracket to fit upon a saw blade said means including a housing to fit upon the saw, means situated in each groove to extend through a slot, and means received by said extending means to tighten against the adjacent bracket.

17. A saw set comprising an anvil, arms by means of which the anvil is set in a desired position in respect to the saw, a setting member to cooperate with the anvil, a block by which the setting member is supported, and means on the anvil by which the block is carried and upon which the block is movable so that more than one tooth may be reached by the setting member in one position of the saw set.

18. A saw set comprising an anvil, arms by means of which the anvil is set in a desired position in respect to a saw, a setting member, a setting block by which the setting member is carried, and a bar carried by the anvil along which the setting block is slidable so that the setting member may be moved to more than one setting position in one position of the saw set.

19. A saw set comprising an anvil, arms having rests by means of which contact is made with a saw to support the anvil in the desired position in respect to the teeth, means by which the anvil may be adjusted up and down between the arms so as to accommodate various lengths of teeth, a setting member adapted to engage the teeth on the side opposite to the anvil, a block by means of which the setting member is carried, and means on the anvil upon which the block is both swingable and slidable, swingable to permit raising the block and slidable so that the setting member may be moved opposite various teeth in one position of the saw set.

20. A saw set comprising an arm having a rest by which contact with a saw blade is made, an anvil situated beside the arm, a handle by means of which the saw set is carried, clamp means by which the position of the anvil may be changed in respect to said arm and the handle so that the anvil may be adaptable to various lengths of saw teeth, a setting member cooperating with the anvil, and a setting block having both a hinged and slidable mounting on the anvil respectively for the purposes of moving the setting member into an inoperative position and into operative positions opposite various teeth.

In testimony whereof I affix my signature in presence of two witnesses. 715.

CARL ALFRED HANSON.

Witnesses:
CHARLES H. CHIPMAN,
JOHN CARLSON.